(No Model.)

H. A. CROSSLEY.
BRAKE FOR MOTOR CARS.

No. 440,398. Patented Nov. 11, 1890.

Witness,
E. Jay Pinney
E. A. Tibbitts

Inventor,
Harry A. Crossley.
By Geo. W. Tibbitts Atty.

THE NORRIS PETERS CO., PHOTO-LITHO., WASHINGTON, D. C.

UNITED STATES PATENT OFFICE.

HARRY A. CROSSLEY, OF CLEVELAND, OHIO.

BRAKE FOR MOTOR-CARS.

SPECIFICATION forming part of Letters Patent No. 440,398, dated November 11, 1890.

Application filed September 15, 1890. Serial No. 364,945. (No model.)

*To all whom it may concern:*

Be it known that I, HARRY A. CROSSLEY, a citizen of the United States, residing at Cleveland, in the county of Cuyahoga and State of Ohio, have invented certain new and useful Improvements in Brakes for Motor Street-Cars, of which the following is a specification.

This invention relates to brake mechanism for motor street-cars in which the momentum of the car is employed as the power for applying the brakes; and the invention consists in the novel construction and combinations, as hereinafter described, and pointed out in the claims.

Figure 1:
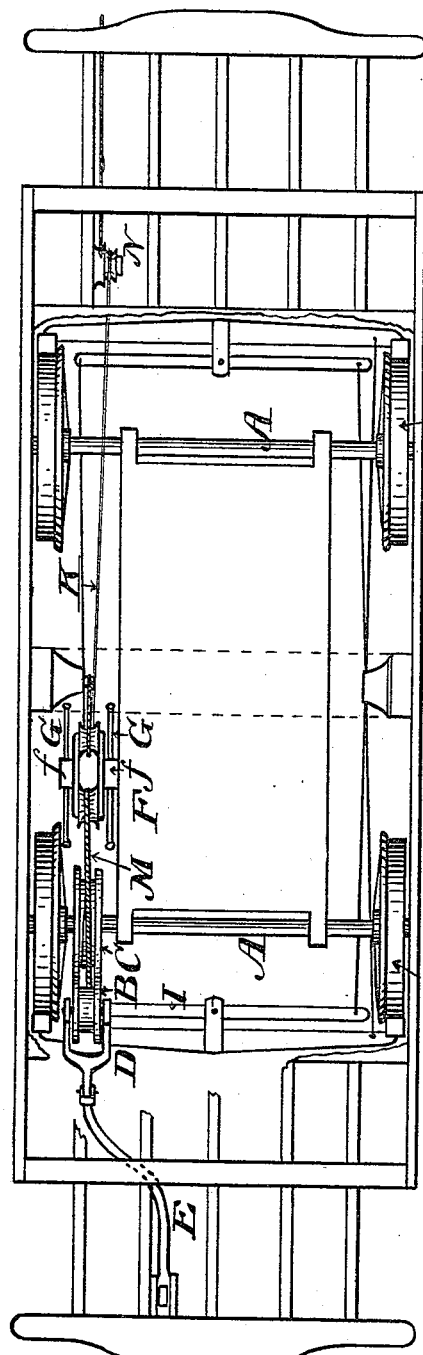
Figure 2:
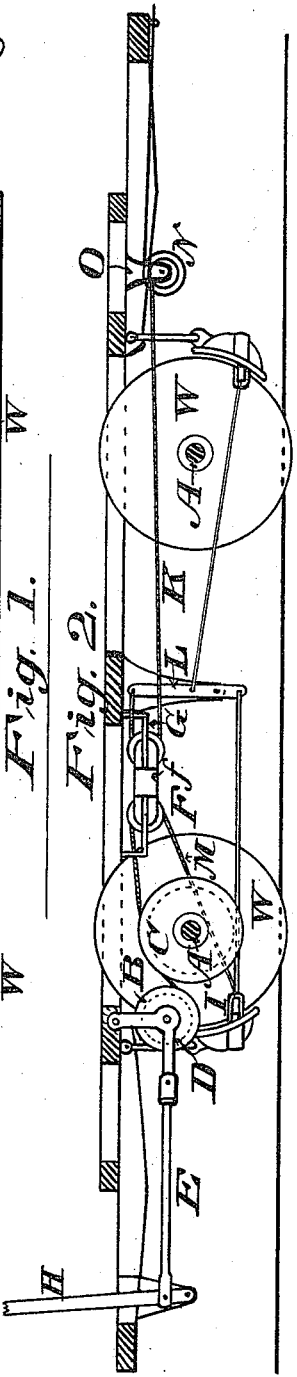
Figure 3:
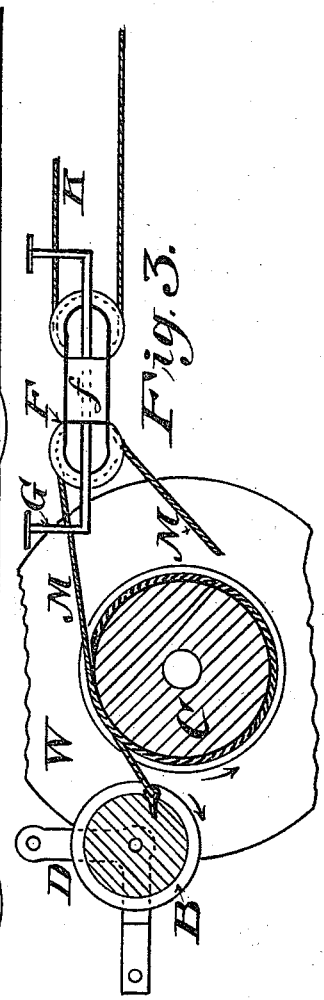

In the accompanying drawings, Figure 1 is a top or plan view of a car-truck having my invention attached. Fig. 2 is a longitudinal section of the same. Fig. 3 is an enlarged detail view, partly in section, of the wheels and accompanying mechanism for applying power therefrom.

A A are the axles, and W W are the car-wheels. On one of the axles I fix a grooved wheel C, which is employed for applying power to the brakes derived from the momentum of the car.

B is a grooved wheel of somewhat smaller diameter than wheel C and is journaled in a yoke-hanger D, pivotally attached to a cross-beam of the car-truck and directly in front of wheel C. The forward end of said yoke is connected to a hand-lever H at the front of the platform by a connecting-rod E. The two wheels B C have a deep square groove in their peripheries, leaving sufficiently broad-faced flanges to allow considerable friction when said wheels are brought in contact.

F is a double pulley-frame, having lugs *f f* on its sides, through which the horizontal parts of hanger-supports G G pass, suspended from a beam of the car-truck, and upon which the pulley-frame may have a sliding movement. This pulley-frame is located directly in rear of the wheel C.

M is a rope, one end of which is fastened to the wheel B and passes one or more times around wheel C. Thence it passes over a pulley in the frame F, passing thence down and having its end secured to the end of brake-lever I.

K is a second rope or chain, one end of which is attached to the upper end of brake-lever L, and passing around the rear pulley in frame F passes thence to the rear of the car-frame, where it may be secured by a hook; or, if required for connecting with and for operating the brake mechanism on a trail-car, it is attached to a differential spool M, journaled in a suitable hanger O, secured to a beam of the car-frame. The end of rope K is attached to the periphery of the small spool, passing once around it. From the large spool a rope or chain passes to the rear of the car and is to be connected with a rod or cord of the brake mechanism of a trail-car. The rope K unwinds from the spool when pulled and rotates said spool and winds the rear rope onto the spool. This spool is thus provided for lessening the power applied to the trailer-brake, as it needs less.

The operations of this mechanism are as follows: The operator, pulling backward on the hand-lever H, pushes the wheel B into contact with wheel C. This causes wheel B to rotate and tighten the rope around wheel C. The rope is then drawn forward and pulls on the brake-lever I with great force. At the same time the sliding pulley-frame F is drawn forward, and pulling rope K the power is applied to the brakes of both cars at once.

Having described my invention, I claim as follows:

1. In a power-brake mechanism for motor-cars, the combination, with car-axle A, of a grooved wheel C and grooved wheel B, suspended by yoke D and having a rope attached thereto and passing around said wheel C and connected with the brake mechanism, constructed and arranged to operate substantially as specified.

2. In power-brake mechanism for motor-cars, the combination, with axle A, of a grooved wheel C, grooved wheel B, suspended by yoke D, connected with and operated by hand-lever H, a rope attached to said wheel B and passing around said wheel C, also passing over pulley in sliding frame F and connected with brake-levers I, and a rope K over rear pulley in frame F and extending to rear for connection with trail-car, constructed and operating substantially as specified.

HARRY A. CROSSLEY.

Witnesses:
E. JAY PINNEY,
GEO. W. TIBBITTS.